United States Patent
Reuter

[11] Patent Number: 6,164,985
[45] Date of Patent: Dec. 26, 2000

[54] CONNECTING ELEMENT

[75] Inventor: Wolfgang Reuter, Burbach, Germany

[73] Assignee: Rittal-Werk Rudolf Loh GmbH & Co. KG, Herborn, Germany

[21] Appl. No.: 09/462,726

[22] PCT Filed: Dec. 18, 1998

[86] PCT No.: PCT/EP98/08256

§ 371 Date: Jan. 12, 2000

§ 102(e) Date: Jan. 12, 2000

[87] PCT Pub. No.: WO99/37003

PCT Pub. Date: Jul. 22, 1999

[30]  Foreign Application Priority Data

Jan. 19, 1998 [DE]  Germany ............................ 198 01 720

[51] Int. Cl.[7] .............................................. H01R 13/648
[52] U.S. Cl. .............................................. 439/92; 361/800
[58] Field of Search .............................. 439/92; 361/800, 361/816, 818, 799; 174/51, 35 R

[56]  References Cited

U.S. PATENT DOCUMENTS 5,853,296  12/1998  Gunther et al. ............................ 439/92
5,894,106   4/1999  Schwenk ................................. 361/800
5,930,120   7/1999  Gunther ................................. 361/800
6,042,395   3/2000  Munch et al. ............................ 439/92

FOREIGN PATENT DOCUMENTS 195 25 851 C1   7/1996   Germany.
195 25 881 C1   7/1996   Germany.
296 18 625 U1   1/1997   Germany.

*Primary Examiner*—Neil Abrams
*Attorney, Agent, or Firm*—Pauley Petersen Kinne & Fejer

[57]  ABSTRACT

A connecting element having a bracket for fastening side walls of a switchgear cabinet onto a frame profile of a switchgear cabinet frame and having a contact spring connected to the bracket for providing an electrical connection between the side walls and the frame legs of the switchgear cabinet frame. The contact springs have contact points disposed in the direction of the side wall, which contact points protrude above the contact surface of the frame profile on which a corresponding side wall is disposed.

8 Claims, 2 Drawing Sheets

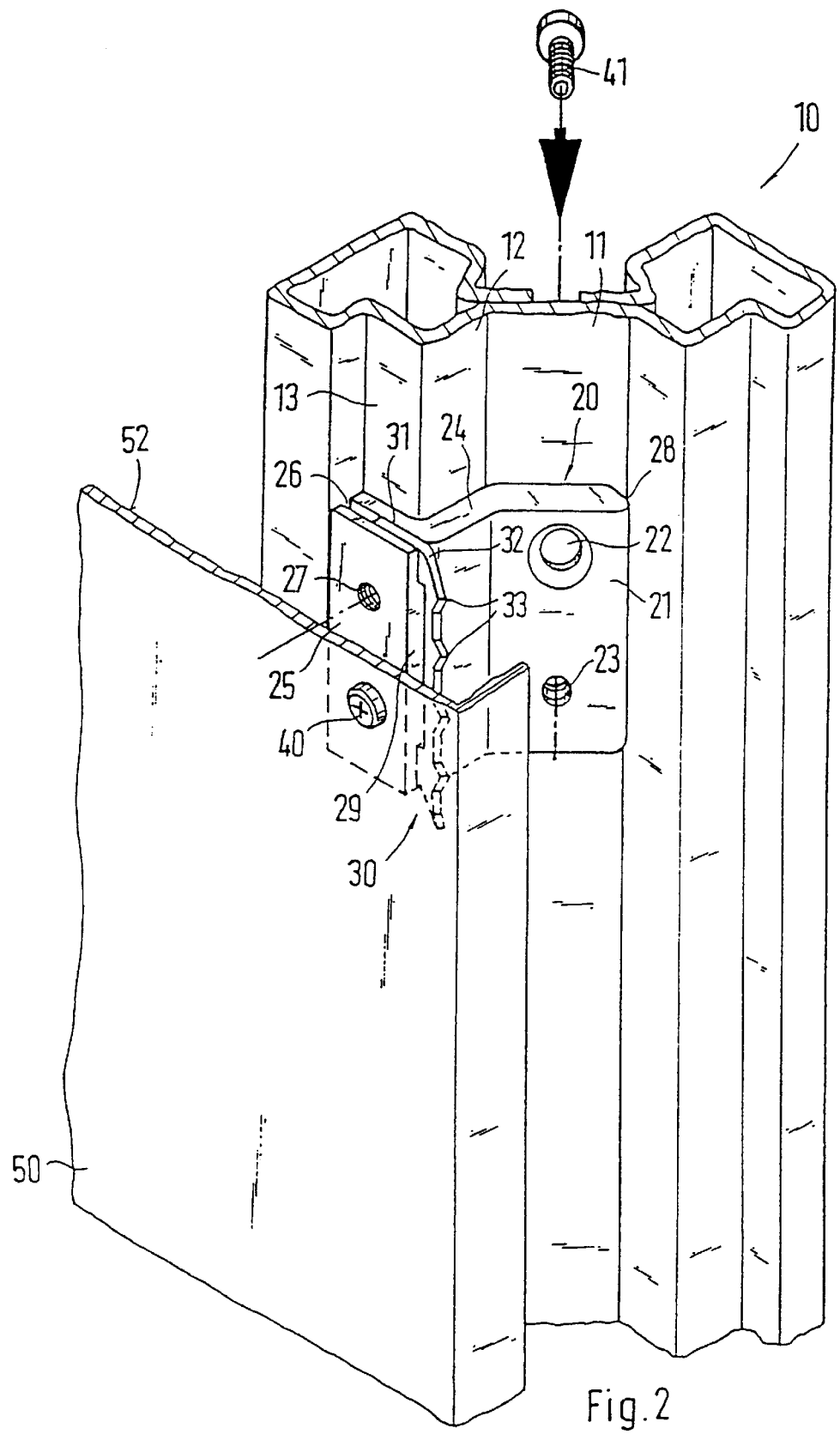

CONNECTING ELEMENT

BACKGROUND OF THE INVENTION

1. Field of the Invention

This invention relates to a connecting element having a bracket for fastening the side walls of a switch cabinet to frame sections of a switch cabinet frame, wherein contact springs are attached to the brackets for electrical connection of the side walls to the frame legs, which are provided with contact points that face in the direction of the side wall, in which the contact points protrude above a contact surface of the frame section, on which the corresponding side wall lies.

2. Description of Prior Art

This type of connecting element is taught, for example, by German Patent Publication DE 19 525 851 C1 wherein the connecting element is clamped in a beveled region of the frame section on the outside. The connecting element carries a contact spring, which is provided with contact points, the contact points facing in the direction of a side wall. The contact points are bent on the contact springs so that they are secured by means of a sealing piece of the frame section. The connecting element is provided with a threaded mount for attachment to the side wall, onto which the side wall can be screwed. During tightening of the fastening screw used for this purpose, the side wall is tightened against the sealing piece. The contact points then dig into the paint of the side wall and produce an electrical contact. The contact points are clamped between the side wall and the sealing piece when the side wall is screwed on.

SUMMARY OF THE INVENTION

It is one object of this invention to provide a connecting element of the type mentioned at the outset that is simple to manufacture and guarantees reliable contact.

This object is addressed by a connecting element having a bracket for fastening the side walls of a switch cabinet to frame sections of the switch cabinet frame wherein the bracket has a fastening plate that is screwed onto an outer wall of the frame section and that grades into a fastening section positioned vertical to the side wall, to which a running leg is connected parallel to the side wall, which is equipped with at least one threaded mount for attachment of the side wall. The leg has two plug-in receptacles that are arranged at a spacing from each other in the longitudinal direction of the frame section and in which plug-in projections of the contact springs are accommodated. A spring plate is connected to the plug-in projections, which is sloped at an angle less than or equal to 90° relative to the side wall and secures the contact points to the side of the contact surface for the side wall.

The connecting element of this invention comprises only two components that can be simply joined to each other by way of the plug-in projections and the corresponding plug-in receptacles.

Owing to the fact that the contact points protrude to one side of the contact surface for the side wall, reliable contacting is guaranteed. During assembly, the contact points dig into the paint of the side wall and thus permit contacting. At the same time, the contact spring is forced against the side wall, spring-pretightened with its contact points. Reliable contacting is maintained by this pressing force.

In accordance with one embodiment of this invention, the contact spring is a U-shaped clamp having two parallel spaced arms that form the plug-in projections which are connected to each other by means of the spring plate which is angled relative to the plug-in projections. A support length that permits support of the contact spring stable to tilting is created with spacing of the arms.

For simplified assembly, in accordance with one embodiment of this invention, the insertion movement of the contact spring into the bracket is limited by a stop, so that the contact spring can always be assembled in a predetermined position. Moreover, the plug-in projections of the contact spring are clamped into the plug-in receptacles. The bracket and contact springs can therefore be preassembled, so that only one component needs be fastened to the frame section during assembly of the side wall. In addition, clamping free of play of the plug-in projections always permits reliable contacting without special precautions having to be taken for this purpose during assembly of the connecting element.

In accordance with one embodiment of this invention, the fastening plate comprises a screw mount and a threaded mount, which are arranged at a spacing relative to each other in the longitudinal direction of the frame section. The leg also is equipped with two threaded mounts for attachment of the side wall, which threaded mounts are spaced from each other in the longitudinal direction of the frame section by the same degree as the screw mount and the threaded mount of the fastening plate. A connecting element so equipped can be assembled from the outside of the frame section through the screw mount of the fastening plate. However, it is also possible to screw in the fastening plate of the switch cabinet. For this purpose, a fastening screw is pushed through the frame section and screwed into the threaded mount of the fastening plate. Depending on the chosen type of fastening, one of the two threaded mounts of the leg can be used to attach the side wall.

In order to ensure adequate spring rigidity, the contact spring is preferably made from a spring steel.

BRIEF DESCRIPTION OF THE DRAWINGS

These and other objects and features of this invention will be better understood from the following detailed description taken in conjunction with the drawings, wherein:

FIG. 2 shows the frame section of FIG. 1 with the assembled connecting element and a side wall.

DESCRIPTION OF PREFERRED EMBODIMENTS

Figure 1:
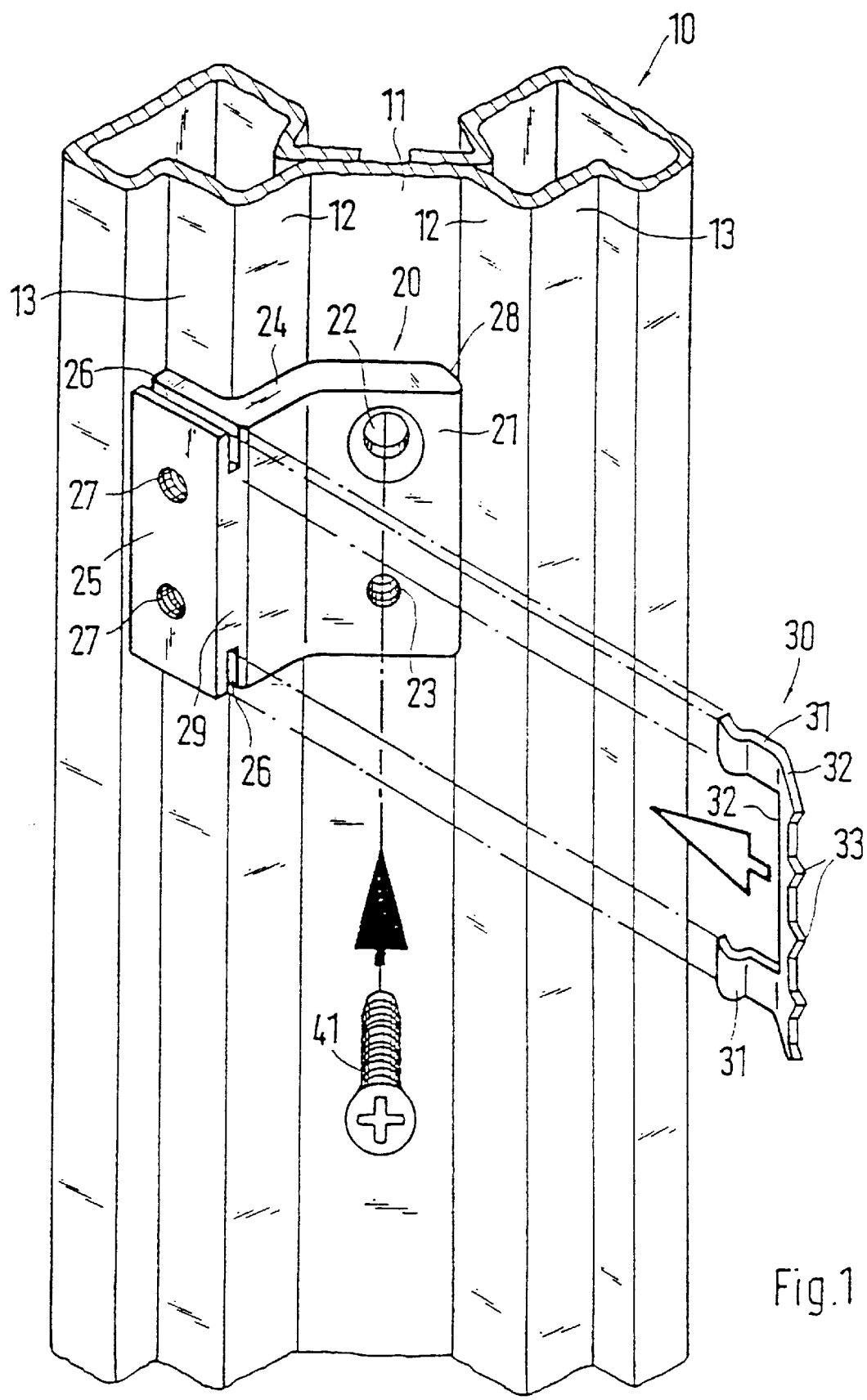
FIG. 1 shows, in a perspective exploded view, a frame section with a connecting element attached to it in accordance with one embodiment of this invention.

A vertical frame section 10 of a frame is shown in FIG. 1. Such frames serve as supports in a switch cabinet.

The frame section 10 has an outer wall 11, to which two angles 12 are connected. The angles 12 grade at right angles into section sides 13. A connecting element is provided which can be screwed onto the outer wall 20. The connecting element comprises a bracket 20, which has a vertically running fastening plate 21. A transitional section 24 is connected to fastening plate 21. A leg 25 is also angled from the transition section 24. The leg 25 is parallel to the corresponding outer side of the frame. The fastening plate 21 comprises a screw mount 22 and a threaded mount 23. The screw mount 22 is arranged in the longitudinal direction of frame section 10 at a spacing from threaded mount 23.

In accordance with one embodiment of this invention, fastening screw 41 is used to attach bracket 20 to frame section 10. Fastening screw 41 can be passed through the screw mount 22 and screwed to frame section 10. In accordance with one embodiment of this invention, assembly of bracket 20 is achieved from the inside of the switch cabinet, which is further shown in FIG. 2. In accordance with this embodiment, the fastening screw 41 is pushed from the back side through the outer wall 11 and screwed into the threaded mount 23 of fastening plate 21. Depending on the spatial circumstances, either the fastening variant according to FIG. 1 or FIG. 2 can be used.

In order to be able to produce electrical contact between the frame section 10 and a side wall 50 (see, for example, FIG. 2), a contact spring 30 is used. The contact spring 30 is U-shaped and has parallel-spaced plug-in projections 31. The two plug-in projections 31 are connected to each other by a spring plate 32. The spring plate 32 is bent relative to the plug-in projections 31. The spring plate 32 comprises five contact points 33 that are directed obliquely relative to the corresponding outside of the switch cabinet. The contact spring 30 can be introduced to plug-in receptacles 26 with the plug-in projections 31. The plug-in receptacles 26 are disposed laterally in the arm 25 of bracket 20. The plug-in projections 31 have a slight overdimension relative to the plug-in receptacles 26, so that the contact spring 30 is clamped to the leg 25. The contact spring 30 can be pushed from either side of arm 25 of bracket 20 with its plug-in projections 31 into plug-in receptacle 26. The plug-in projections 31 are preferably bent in corrugated fashion, so that they can be tightened elastically in the plug-in receptacles 26.

FIG. 2 shows the bracket 20 mounted on a frame section 10. A side wall 50 is attached to leg 25 of bracket 20. The side wall 50 forms an opening that is arranged flush with a threaded mount 27 formed by leg 25. A fastening screw 40 is pushed through the opening and screwed into threaded mount 27. During tightening of the fastening screw 40, the side wall 50 is moved in the direction toward contact points 33. The contact points 33 then encounter the inside surface 52 of side wall 50. They dig into the paint of side wall 50 and thus produce electrical contact with bracket 20 and thus frame section 10. In the tightened state of the side wall, the contact spring 30 is held on the inside surface 52 by spring tension with its contact points 33, so that reliable contacting is always guaranteed.

As shown in FIG. 2, two threaded mounts 27 are formed by leg 25, which are arranged at a spacing relative to each other in the longitudinal direction of frame section 10. This spacing corresponds to the spacing of the threaded mount 23 formed by fastening plate 21 to screw mount 22. Depending on the selected type of fastening (screwing of the inside or outside of the switch cabinet), one or the other threaded mount 27 in leg 25 can be used for fastening of side wall 50.

The connecting element in accordance with this embodiment of the invention is particularly suited for reliable removal of large short circuit currents. For example, when such a short circuit current flows through side wall 50, it can flow off through contact points 33 into bracket 20 and thus into the grounded frame section 10. It can happen at very high currents that the contact points 33 burn up. However, because they are spring-pretightened against the inside surface 52 of the side wall, reliable contacting is also maintained in this operating state.

What is claimed is:

1. In a connecting element having a bracket for attachment of side walls of a switch cabinet to frame sections of a switch cabinet frame and contact springs fastened to the bracket for electrical connection of the side walls to frame legs of said switch cabinet frame, which contact springs comprise a plurality of contact points facing in a direction of the side wall, which contact points protrude above a contact surface of the frame section on which a corresponding side wall is disposed, the improvement comprising: said bracket (20) comprising a fastening plate (21) attached to an outer wall (11) of said frame section (10), said fastening plate (21) grading into a fastening section disposed vertically with respect to said side wall (50), a running leg (25) connected parallel to said side wall (50) and forming at least one threaded mount (27) for attachment of said side wall (50), said leg (25) forming two plug-in receptacles (26) disposed at a spacing from each other in a longitudinal direction of said frame section (10) and in which corresponding plug-in projections (31) of said contact spring (30) are disposed, and a spring plate (32) connected to the plug-in projections (31), said spring plate (32) being sloped at an angle less than or equal to about 90° relative to said side wall (50) and holding said contact points (33) to a side of a contact surface of said side wall (50).

2. In a connecting element according to claim 1, wherein said contact spring (30) is a U-shaped clamp having two parallel spaced arms that form the plug-in projections (31) and are connected to each other by said spring plate (32), said spring plate (32) being angled relative to said plug-in projections (31).

3. In a connecting element according to claim 1, wherein said leg (25) comprises a stop (29) which limits an insertion movement of said contact spring (30) into said bracket (20) and said plug-in projections (31) of said contact spring (30) are clamped in the plug-in receptacles (26).

4. In a connecting element according to claim 1, wherein the fastening plate (21) forms a screw mount (22) and a threaded mount (23), spaced apart from each other in the longitudinal direction of said frame section (10), and the leg (25) forms two leg threaded mounts (27) for fastening of said side wall (50), said two leg threaded mounts (27) spaced relative to each other in the longitudinal direction of said frame section (10) to a same degree as the screw mount (22) and the threaded mount (23) of said fastening plate (21).

5. In a connecting element according to claim 1, wherein the contact spring (30) is made from a spring steel.

6. In a connecting element according to claim 2, wherein said leg (25) comprises a stop (29) which limits an insertion movement of said contact spring (30) into said bracket (20), and said plug-in projections (31) of said contact spring (30) are clamped in the plug-in receptacles (26).

7. In a connecting element according to claim 6, wherein the fastening plate (21) forms a screw mount (22) and a threaded mount (23) spaced apart from each other in the longitudinal direction of said frame section (10), and the leg (25) forms two leg threaded mounts (27) for fastening of said side wall (50), said two leg threaded mounts (27) spaced relative to each other in the longitudinal direction of said frame section (10) to a same degree as the screw mount (22) and the threaded mount (23) of said fastening plate (21).

8. In a connecting element according to claim 7, wherein the contact spring (30) is made from a spring steel.

* * * * *